United States Patent
Uchida et al.

(10) Patent No.: US 12,252,571 B2
(45) Date of Patent: Mar. 18, 2025

(54) VINYL ACETATE-SILICONE COPOLYMER RESIN AND METHOD FOR PRODUCING SAME

(71) Applicant: Nissin Chemical Industry Co., Ltd., Echizen (JP)

(72) Inventors: Koki Uchida, Echizen (JP); Kentaro Watanabe, Echizen (JP)

(73) Assignee: NISSIN CHEMICAL INDUSTRY CO., LTD., Fukui-ken (JP)

( * ) Notice: Subject to any disclaimer, the term of this patent is extended or adjusted under 35 U.S.C. 154(b) by 14 days.

(21) Appl. No.: 17/672,917

(22) Filed: Feb. 16, 2022

(65) Prior Publication Data

US 2022/0275134 A1  Sep. 1, 2022

(30) Foreign Application Priority Data

Feb. 26, 2021  (JP) .................................. 2021-030514

(51) Int. Cl.
   *C08F 283/12*  (2006.01)
   *C08F 218/08*  (2006.01)

(52) U.S. Cl.
   CPC ...... *C08F 283/124* (2013.01); *C08F 283/122* (2013.01); *C08F 218/08* (2013.01); *C08F 283/12* (2013.01)

(58) Field of Classification Search
   CPC ................ C08F 283/12; C08F 283/122; C08F 283/124; C08F 218/08
   See application file for complete search history.

(56) References Cited

U.S. PATENT DOCUMENTS

| | | | | | |
|---|---|---|---|---|---|
| 4,987,180 | A | * | 1/1991 | Ohata | D06M 15/65 |
| | | | | | 524/588 |
| 5,457,167 | A | * | 10/1995 | Higaki | C08G 77/50 |
| | | | | | 528/25 |
| 2020/0032013 | A1 | * | 1/2020 | Park | C08G 77/442 |

FOREIGN PATENT DOCUMENTS

| | | | | | |
|---|---|---|---|---|---|
| CN | 1887921 A | * | 1/2007 | | |
| GB | 1161072 A | * | 8/1969 | | C08F 230/08 |
| JP | 2020-90563 A | | 6/2020 | | |
| WO | WO-2017073194 A1 | * | 5/2017 | | C08L 21/00 |

OTHER PUBLICATIONS

Translation of WO-2017073194-A1 from Patentscope (Year: 2017).*
Machine Translation of CN-1887921-A obtained from IP.com (Year: 2007).*
Park, S.K.; Choi, M.; Kim, D.W.; Park, B.J.; Shin, E.J.; Park, S.; Yun, S. Dielectric Elastomers UV-Cured from Poly(dimethylsiloxane) Solution in Vinyl Acetate. Polymers 2020, 12, 2660. Published Nov. 11, 2020. https://doi.org/10.3390/polym12112660 (Year: 2020).*

* cited by examiner

*Primary Examiner* — Kregg T Brooks
*Assistant Examiner* — David R. Foss
(74) *Attorney, Agent, or Firm* — WHDA, LLP

(57) ABSTRACT

The present invention provides a vinyl acetate-silicone copolymer resin obtained by graft polymerization of vinyl acetate (B) onto an organopolysiloxane (A) represented by a specific general formula, wherein a weight ratio of the organopolysiloxane (A) to the vinyl acetate (B) is (A):(B) =10:90 to 95:5, a method for producing the same, and a vinyl acetate-silicone copolymer resin composition. The vinyl acetate-silicone copolymer resin of the present invention has slidability, substrate adhesiveness, and organic solvent solubility, and is suitably used for coating agents for various substrates, adhesive agents, exterior and interior paints for structures and building materials and the like, and cosmetics and the like.

8 Claims, No Drawings

VINYL ACETATE-SILICONE COPOLYMER RESIN AND METHOD FOR PRODUCING SAME

CROSS-REFERENCE TO RELATED APPLICATION

This non-provisional application claims priority under 35 U.S.C. § 119(a) on Patent Application No. 2021-030514 filed in Japan on Feb. 26, 2021, the entire contents of which are hereby incorporated by reference.

TECHNICAL FIELD

The present invention relates to a resin obtained by copolymerizing an organopolysiloxane with vinyl acetate and a method for producing the same, and more specifically, to a vinyl acetate-silicone copolymer resin having slidability, substrate adhesiveness, and organic solvent solubility and a method for producing the same.

BACKGROUND ART

Silicone-based resins have been conventionally known as resins capable of imparting slidability to a substrate. However, when the silicone-based resin is used alone, the silicone-based resin causes a problem such as poor adhesiveness to the substrate.

Therefore, a method in which another monomer such as an acrylic monomer or a urethane monomer is copolymerized with a silicone-based resin is used. For example, a copolymer such as an acrylic silicone copolymer or a urethane silicone copolymer can impart advantages such as weather resistance, heat resistance, cold resistance, water repellency, gas permeability, and slidability of a silicone resin to a normal acrylic or urethane-based emulsion. For example, Patent Document 1 (JP-A 2020-90563) discloses a silicone acrylic graft copolymer resin which imparts slidability, and a method for producing the same.

Meanwhile, a vinyl acetate resin has been conventionally used as an emulsion adhesive agent, a photosensitive material for screen printing, a washing paste, a chewing gum base, an emulsifier, and a substrate for cosmetics, and has been known as a resin having good adhesiveness.

Examples of the resin obtained by copolymerizing a vinyl acetate resin with other monomer include an ethylene-vinyl acetate copolymer obtained by copolymerizing ethylene. This copolymer is a synthetic resin having adhesive property and flexibility derived from a vinyl acetate unit, and is used for a coating material for a paper container such as food packaging paper or a paper cup, an adhesive agent for cloth and paper labels, an emulsion-based adhesive agent, a chewing gum base, artificial turf, a bottom material of sandals, a bath mat, a bath cleaning boot, a beat plate, and a glue, and the like.

The silicone resin and the vinyl acetate resin are resins having contradictory performance. Each of the silicone resin and the vinyl acetate resin has been known to be reacted with other monomer to be copolymerized, but an attempt to copolymerize the two resins has not been made so far. It has not been considered that the copolymerization of silicone and vinyl acetate can provide a resin which makes use of the respective performances.

A method in which a silicone resin emulsion and a vinyl acetate resin emulsion are mixed to obtain a coating agent is also conceivable, but in the mixture, the silicone component bleeds out, whereby desired performance cannot be obtained, which has room for improvement.

CITATION LIST

Patent Document 1: JP-A 2020-90563

SUMMARY OF THE INVENTION

The present invention has been made in view of the above circumstances, and an object thereof is to provide a vinyl acetate-silicone copolymer resin having slidability, substrate adhesiveness, and organic solvent solubility.

As a result of intensive studies to achieve the above object, the present inventors have found that a vinyl acetate-silicone copolymer resin obtained by copolymerizing an organopolysiloxane (A) and a vinyl acetate (B), particularly copolymerizing the organopolysiloxane (A) and the vinyl acetate (B) by an emulsion polymerization method has slidability, substrate adhesiveness, and organic solvent solubility, and have completed the present invention.

Therefore, the present invention provides a vinyl acetate-silicone copolymer resin, a method for producing the same, and a resin composition containing the copolymer resin, as described later.

1. A vinyl acetate-silicone copolymer resin obtained by graft polymerization of vinyl acetate (B) onto an organopolysiloxane (A) represented by the following general formula (1), wherein a weight ratio of the organopolysiloxane (A) to the vinyl acetate (B) is (A):(B) =10:90 to 95:5,

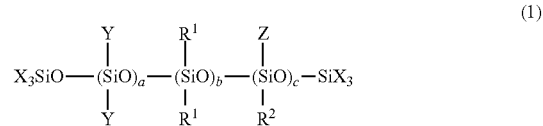

(1)

wherein $R^1$ is the same or different substituted or unsubstituted monovalent hydrocarbon group of 1 to 20 carbon atoms, $R^2$ is a mercapto, acryloxy or methacryloxy group-substituted alkyl group having 1 to 6 carbon atoms, or a vinyl group, X is the same or different substituted or unsubstituted monovalent hydrocarbon group of 1 to 20 carbon atoms, an alkoxy group having 1 to 20 carbon atoms, or a hydroxyl group, Y is the same or different group represented by X or —[O—Si(X)$_2$]$_d$—X, at least two of X and Y being hydroxyl groups, Z is an alkyl group having 1 to 4 carbon atoms, an alkoxy group having 1 to 4 carbon atoms, or a hydroxyl group, a is a positive number of 0 to 1,000, b is a positive number of 100 to 10,000, c is a positive number of 1 to 10, and d is a positive number of 1 to 1,000.

2. The vinyl acetate-silicone copolymer resin according to the above 1, wherein the vinyl acetate-silicone copolymer resin is an emulsion having a viscosity (25° C.) of 1 to 500 mPa·s.

3. The vinyl acetate-silicone copolymer resin according to the above 1, wherein the organopolysiloxane as the component (A) has a weight average molecular weight (Mw) of 10,000 to 1,000,000.

4. The vinyl acetate-silicone copolymer resin according to the above 1, wherein the organopolysiloxane represented by the formula (1) is a polymer of a cyclic organosiloxane, an α,ω-dihydroxysiloxane oligomer, an α,ω-dialkoxysiloxane oligomer, or an alkoxysilane, and a silane coupling agent represented by the following general formula (2):

$$R^3_{(4-e-f)}R^4_f Si(OR^5)_e \quad (2)$$

wherein $R^3$ is a mercapto, acryloxy or methacryloxy group-substituted alkyl group having 1 to 6 carbon atoms, R is an alkyl group having 1 to 4 carbon atoms, $R^5$ is an alkyl group having 1 to 4 carbon atoms, e is 2 or 3, f is 0 or 1, and e+f is 2 or 3.

5. A method for producing a vinyl acetate-silicone copolymer resin,
   the method comprising subjecting an organopolysiloxane (A) represented by the following general formula (1) and vinyl acetate (B) to emulsion polymerization at a weight ratio of (A):(B)=10:90 to 95:5 to obtain a vinyl acetate-silicone copolymer resin emulsion:

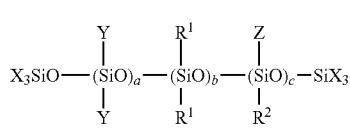

(1)

wherein $R^1$ is the same or different substituted or unsubstituted monovalent hydrocarbon group of 1 to 20 carbon atoms, $R^2$ is a mercapto, acryloxy or methacryloxy group-substituted alkyl group having 1 to 6 carbon atoms, or a vinyl group, X is the same or different substituted or unsubstituted monovalent hydrocarbon group of 1 to 20 carbon atoms, an alkoxy group having 1 to 20 carbon atoms, or a hydroxyl group, Y is the same or different group represented by X or —[O—Si(X)$_2$]$_d$—X, at least two of X and Y being hydroxyl groups, Z is an alkyl group having 1 to 4 carbon atoms, an alkoxy group having 1 to 4 carbon atoms, or a hydroxyl group, a is a positive number of 0 to 1,000, b is a positive number of 100 to 10,000, c is a positive number of 1 to 10, and d is a positive number of 1 to 1,000.

6. A vinyl acetate-silicone copolymer resin composition containing the vinyl acetate-silicone copolymer resin according to the above 1, wherein the vinyl acetate-silicone copolymer resin composition is used as a product selected from the group consisting of a coating agent, a fiber treatment agent, an adhesive agent, a paint, and a cosmetic.

Advantageous Effects of the Invention

The vinyl acetate-silicone copolymer resin of the present invention has slidability, substrate adhesiveness, and organic solvent solubility. For this reason, the resin composition containing the vinyl acetate-silicone copolymer resin of the present invention is suitably used for coating agents for various substrates, adhesive agents, exterior and interior paints for structures and building materials and the like, and cosmetics and the like.

DESCRIPTION OF THE PREFERRED EMBODIMENT

The present invention provides a vinyl acetate-silicone copolymer resin containing a polymer unit of an organopolysiloxane (A) and vinyl acetate (B).

Here, the organopolysiloxane (A) is represented by the following general formula (1):

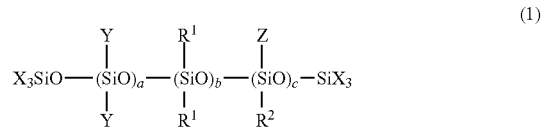

(1)

wherein $R^1$ is the same or different substituted or unsubstituted monovalent hydrocarbon group of 1 to 20 carbon atoms, $R^2$ is a mercapto, acryloxy or methacryloxy group-substituted alkyl group having 1 to 6 carbon atoms, or a vinyl group, X is the same or different substituted or unsubstituted monovalent hydrocarbon group of 1 to 20 carbon atoms, an alkoxy group having 1 to 20 carbon atoms, or a hydroxyl group, Y is the same or different group represented by X or —[O—Si(X)$_2$]$_d$—X, at least two of X and Y being hydroxyl groups, Z is an alkyl group having 1 to 4 carbon atoms, an alkoxy group having 1 to 4 carbon atoms, or a hydroxyl group, a is a positive number of 0 to 1,000, b is a positive number of 100 to 10,000, c is a positive number of 1 to 10, and d is a positive number of 1 to 1,000.

Here, $R^1$ is the same or different substituted or unsubstituted monovalent hydrocarbon group having 1 to 20 carbon atoms. Specific examples thereof include alkyl groups such as methyl, ethyl, propyl, butyl, pentyl, hexyl, heptyl, octyl, nonyl, decyl, dodecyl, tetradecyl, hexadecyl, and octadecyl groups; cycloalkyl groups such as cyclopentyl, cyclohexyl, and cycloheptyl groups; alkenyl groups such as vinyl and allyl groups; aryl groups such as phenyl, tolyl, and naphthyl groups; alkenylaryl groups such as a vinylphenyl group, aralkyl groups such as benzyl, phenylethyl, and phenylpropyl groups; alkenylaralkyl groups such as vinylbenzyl and vinylphenylpropyl groups; and a substituted one in which a part or all hydrogen atoms of the above groups are substituted with a halogen atom such as fluorine, bromine or chlorine, an acryloxy group, a methacryloxy group, a carboxyl group, an alkoxy group, an alkenyloxy group, an amino group, and an alkyl-, alkoxy- or (meth)acryloxy-substituted amino group. $R^1$ is preferably a methyl group.

$R^2$ is a mercapto, acryloxy or methacryloxy group-substituted alkyl group having 1 to 6 carbon atoms, or a vinyl group. Specifically, mercaptopropyl, acryloxypropyl, methacryloxypropyl, and vinyl groups, and the like are preferable.

X is the same or different substituted or unsubstituted monovalent hydrocarbon group having 1 to 20 carbon atoms, an alkoxy group having 1 to 20 carbon atoms, or a hydroxyl group. Examples of the unsubstituted or substituted monovalent hydrocarbon group having 1 to 20 carbon atoms include those exemplified in $R^1$. Specific examples of the alkoxy group having 1 to 20 carbon atoms include methoxy, ethoxy, propoxy, butoxy, hexyloxy, heptyloxy, octyloxy, decyloxy, and tetradecyloxy groups. Preferably, X is a hydroxyl group, a methyl group, a butyl group, or a phenyl group.

Y is the same or different group represented by X or —[O—Si(X)$_2$]$_d$—X.

Z is an alkyl group having 1 to 4 carbon atoms, an alkoxy group having 1 to 4 carbon atoms, or a hydroxyl group, and preferably a hydroxyl group or a methyl group.

The subscript "a" is a number of 0 to 1,000, and preferably 0 to 200, because the strength of a film to be obtained when the resin composition containing the component (A) is used as a coating film becomes insufficient if "a" exceeds 1,000. The subscript "b" is a positive number of 100 to 10,000, and preferably 1,000 to 5,000, because a film becomes less flexible if "b" is less than 100 and its tear strength is lowered if "b" exceeds 10,000. The subscript "c" is a positive number of 1 to 10, and if "c" exceeds 10, there is a problem that a sliding effect cannot be exhibited.

The subscript "d" is a positive number of 1 to 1,000, and preferably 1 to 200. From the viewpoint of crosslinkability, it is preferable to use an organosiloxane having at least 2 hydroxyl groups, and preferably 2 to 4 hydroxyl groups per molecule formed at both ends.

The organopolysiloxane (A) is preferably used in an emulsion form, and it may be selected from commercial products or synthesized. Synthesis may be conducted by any known emulsion polymerization methods. For example, the organopolysiloxane may be readily synthesized by emulsifying and dispersing a cyclic organosiloxane which may have a fluorine atom, a (meth)acryloxy, carboxyl, hydroxyl, or amino group, or an α,ω-dihydroxysiloxane oligomer, an α,ω-dialkoxysiloxane oligomer or an alkoxysilane, and a silane coupling agent represented by the following general formula (2) in water with using an anionic surfactant, and thereafter adding a catalyst such as an acid as necessary, to achieve a polymerization reaction:

$$R^3_{(4-e-f)}R^4_f Si(OR^5)_e \tag{2}$$

wherein $R^3$ represents a monovalent organic group having a polymerizable double bond, particularly an acryloxy or methacryloxy group-substituted alkyl group having 1 to 6 carbon atoms, $R^4$ is an alkyl group having 1 to 4 carbon atoms, $R^5$ is an alkyl group having 1 to 4 carbon atoms, e is 2 or 3, f is 0 or 1, and e+f is 2 or 3.

Examples of the cyclic organosiloxane include hexamethylcyclotrisiloxane (D3), octamethylcyclotetrasiloxane (D4), decamethylcyclopentasiloxane (D5), dodecamethylcyclohexasiloxane (D6), 1,1-diethylhexamethylcyclotetrasiloxane, phenylheptamethylcyclotetrasiloxane, 1,1-diphenylhexamethylcyclotetrasiloxane, 1,3,5,7-tetravinyltetramethylcyclotetrasiloxane, 1,3,5,7-tetramethylcyclotetrasiloxane, 1,3,5,7-tetracyclohexyltetramethylcyclotetrasiloxane, tris(3,3,3-trifluoropropyl)trimethylcyclotrisiloxane, 1,3,5,7-tetra(3-methacryloxypropyl)tetramethylcyclotetrasiloxane, 1,3,5,7-tetra(3-acryloxypropyl)tetramethylcyclotetrasiloxane, 1,3,5,7-tetra(3-carboxypropyl)tetramethylcyclotetrasiloxane, 1,3,5,7-tetra(3-vinyloxypropyl)tetramethylcyclotetrasiloxane, 1,3,5,7-tetra(p-vinylphenyl)tetramethylcyclotetrasiloxane, 1,3,5,7-tetra[3-(p-vinylphenyl)propyl]tetramethylcyclotetrasiloxane, 1,3,5,7-tetra(N-acryloyl-N-methyl-3-aminopropyl)tetramethylcyclotetrasiloxane, and 1,3,5,7-tetra(N, N-bis(lauroyl)-3-aminopropyl) tetramethylcyclotetrasiloxane. Preferably, octamethylcyclotetrasiloxane and decamethylcyclopentasiloxane are used.

Specific examples of the silane coupling agent include vinylsilanes such as vinyltrimethoxysilane, vinyltriethoxysilane, vinyltripropoxysilane, vinyltriisopropoxysilane, vinylmethyldimethoxysilane, and vinylmethyldiethoxysilane; acrylsilanes such as γ-(meth)acryloxypropyltrimethoxysilane, γ-(meth)acryloxypropyltriethoxysilane, γ-(meth)acryloxypropyltripropoxysilane, γ-(meth)acryloxypropyltriisopropoxysilane, γ-(meth)acryloxypropyltributoxysilane, γ-(meth)acryloxypropylmethyldimethoxysilane, γ-(meth)acryloxypropylmethyldiethoxysilane, γ-(meth)acryloxypropylmethyldipropoxysilane, γ-(meth)acryloxypropylmethyldiisopropoxysilane, and γ-(meth) acryloxypropylmethyldibutoxysilane; and mercaptosilanes such as γ-mercaptopropylmethyldimethoxysilane and γ-mercaptopropyltrimethoxysilane. In some cases, oligomers obtained from polycondensation of the foregoing may be preferable because the generation of alcohol is suppressed. From the viewpoint of reactivity, it is also suitable to use vinylsilanes such as vinyltrimethoxysilane, vinyltriethoxysilane, vinyltripropoxysilane, vinyltriisopropoxysilane, vinylmethyldimethoxysilane, and vinylmethyldiethoxysilane. Here, (meth)acryloxy represents acryloxy or methacryloxy. The silane coupling agent is preferably used in an amount of 0.01 to 20 parts by weight, and more preferably 0.01 to 5 parts by weight per 100 parts by weight of the cyclic organosiloxane.

The copolymerization of the silane coupling agent forms an organopolysiloxane containing units (c) in the following formula, exerting an effect of grafting the vinyl acetate (B).

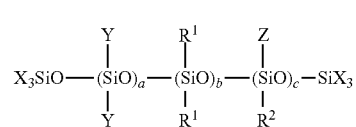

The polymerization catalyst used for polymerization may be any of known polymerization catalysts. Among them, strong acids are preferable, and hydrochloric acid, sulfuric acid, dodecylbenzenesulfonic acid, citric acid, lactic acid, and ascorbic acid are exemplified. Dodecylbenzenesulfonic acid having emulsifying ability is preferable.

The amount of the acid catalyst used is preferably 0.01 to 10 parts by weight, and more preferably 0.2 to 2 parts by weight per 100 parts by weight of the cyclic organosiloxane.

Examples of surfactants used for polymerization include anionic surfactants including sodium lauryl sulfate, sodium laureth sulfate, N-acyl amino acid salts, N-acyl taurate salts, aliphatic soaps, and alkyl phosphate salts. Among them, those surfactants which are soluble in water and free of polyethylene oxide chain are preferable. N-acyl amino acid salts, N-acyl taurate salts, aliphatic soaps, and alkyl phosphate salts are more preferable. Sodium methyl lauroyl taurate, sodium methyl myristoyl taurate, and sodium lauryl sulfate are particularly preferable.

The amount of the anionic surfactant used is preferably 0.1 to 20 parts by weight, and more preferably 0.5 to 10 parts by weight per 100 parts by weight of the cyclic organosiloxane.

A polymerization temperature is preferably 50 to 75° C., and a polymerization time is preferably 10 hours or more, and more preferably 15 hours or more. Furthermore, polymerization is particularly preferably followed by aging at 5 to 30° C. for 10 hours or more.

The organopolysiloxane (A) thus obtained has a weight average molecular weight (Mw) of 10,000 to 1,000,000, and preferably 100,000 to 500,000 as obtained by viscosity measurement. If the weight average molecular weight is less than 10,000, there is a problem that a sliding effect cannot be exhibited.

Here, the weight average molecular weight (Mw) of the organopolysiloxane as obtained by viscosity measurement can be calculated from the specific viscosity ηsp (25° C.) of a toluene solution of the organopolysiloxane having a concentration of 1 g/100 ml.

$$\eta sp = (\eta/\eta 0) - 1$$

(η0: viscosity of toluene, η: viscosity of solution)

$$\eta sp=[\eta]+0.3[\eta]^2$$

$$[\eta]=2.15\times10^{-4} M^{0.65}$$

Specifically, 20 g of an emulsion is mixed with 20 g of isopropyl alcohol (IPA) to break the emulsion. After the IPA is discarded, there is left a rubber-like organopolysiloxane, which is dried at 60° C. overnight. This was used as a toluene solution of an organopolysiloxane having a concentration of 1 g/100 ml. The viscosity of the toluene solution is measured at 25° C. by an Ubbelohde viscometer. The molecular weight can be determined by substituting the viscosity in the formulae (Reference: Nakamuta, Journal of Japan Chemical Society, 77, 858 [1956], Doklady Akad. Nauk. U.S.S.R. 89 65 [1953]).

The vinyl acetate-silicone copolymer resin of the present invention can be obtained by emulsion graft polymerization of the vinyl acetate (B) onto the organopolysiloxane (A) obtained as described above.

The weight ratio of the organopolysiloxane of the formula (1) to the vinyl acetate (the weight ratio of the organopolysiloxane of the formula (1) to the vinyl acetate unit) in the graft polymerization is 10:90 to 95:5, and preferably 20:80 to 85:15. If the proportion of the polysiloxane component of the formula (1) is less than 10, there is a problem that a sliding effect cannot be exhibited.

Examples of the radical initiator used herein include persulfates such as potassium persulfate and ammonium persulfate, aqueous hydrogen persulfate, t-butyl hydroperoxide, and hydrogen peroxide. If necessary, a redox system combined with reducing agents such as acidic sodium sulfite, Rongalite, L-ascorbic acid, tartaric acid, saccharides, and amines may be used. The amount of the radical initiator used is preferably 0.1 to 5 wt %, more preferably 0.5 to 3 wt % of the vinyl acetate (B).

Although the surfactant already contained in the organopolysiloxane emulsion is sufficient for graft polymerization to take place, anionic surfactants such as sodium lauryl sulfate, sodium laureth sulfate, N-acyl amino acid salts, N-acyl taurate salts, aliphatic soaps, and alkyl phosphate salts may be added to improve stability. Nonionic emulsifiers such as polyoxyethylene lauryl ether and polyoxyethylene tridecyl ether may also be added. The amount of the surfactant used is preferably 0.1 to 5 wt % of the vinyl acetate (B).

The graft polymerization temperature of the component (B) with respect to the component (A) is preferably 25 to 85° C., and more preferably 75 to 85° C. A polymerization time is preferably 2 to 8 hours, and more preferably 3 to 6 hours.

Furthermore, a chain transfer agent may be added to adjust the molecular weight and graft ratio of a graft polymer. Examples thereof include halogenated hydrocarbons such as chloroform and carbon tetrachloride; and mercaptans such as n-dodecyl mercaptan, tert-dodecyl mercaptan, and n-octyl mercaptan.

The vinyl acetate-silicone copolymer resin thus obtained is a polymer in which vinyl acetate is randomly grafted.

In the vinyl acetate-silicone copolymer resin obtained above, the solid content of the emulsion is preferably 25 to 40 wt %. The viscosity (25° C.) of the emulsion is preferably 1 to 500 mPa·s, and more preferably 1 to 200 mPa·s. The viscosity can be measured by a rotational viscometer. The mean particle size is preferably 0.1 μm (100 nm) to 0.5 μm (500 nm). The mean particle size can be measured by a laser diffraction/scattering type particle size distribution analyzer.

The vinyl acetate-silicone copolymer resin of the present invention can also be granulated and powderized by the following method. That is, examples thereof include freezing pulverization, spray drying, and air flow drying, and freezing pulverization is preferable in view of productivity. The above freezing pulverization is performed by a known freezing pulverization method. That is, the resin is immersed in liquid nitrogen to be frozen, and the frozen resin is put into a freezing pulverizer to be pulverized into powder. As the freezing pulverizer, a known freezing pulverizer can be used. The mean particle size of the resulting powder particles is preferably as small as possible, and is preferably 50 μm or less. The mean particle size is more preferably 1 to 30 μm. The particle sizes of the emulsion and the powder can be measured as a cumulative weight average value $D_{50}$ in a laser diffraction particle size analyzer.

The vinyl acetate-silicone copolymer resin of the present invention can be used as a resin composition by blending other resins, pigments, fillers, matting agents, antioxidants, ultraviolet absorbers, antifreezing agents, pH adjusting agents, antiseptics, defoamers, antibacterial agents, antifungal agents, light stabilizers, antistatic agents, plasticizers, flame retardants, thickeners, surfactants, organic solvents such as film-forming aids, and other resins and the like, and can be used as a coating agent for various substrates such as synthetic resins, metals, glass, ceramics, gypsum, paper, wood, leather, lightweight concrete, lightweight bubble concrete, mortar, calcium silicate plates, slates, and gypsum boards, an adhesive agent, a coating material binder for exterior and interior of structures and building materials, a paper processing agent, a fiber treatment agent, and a cosmetic material and the like.

When an organic solvent is mixed with the resin composition, examples of the organic solvent include aromatic hydrocarbons such as styrene, toluene, xylene, and ethylbenzene; aliphatic hydrocarbons such as hexane and cyclohexane; ketones such as acetone, methyl ethyl ketone, methyl isobutyl ketone, and cyclohexanone; ethers such as tetrahydrofuran, dioxane, ethylene glycol dimethyl ether, diethylene glycol dimethyl ether, and anisole; esters such as ethyl acetate, butyl acetate, propylene glycol monomethyl ether acetate, and 3-methoxybutyl acetate; cellosolves such as methyl cellosolve, ethyl cellosolve, and butyl cellosolve; alcohols such as methanol, ethanol, isopropanol, and n-butanol; nitriles such as acetonitrile, propionitrile, butyronitrile, and benzonitrile; amide compounds such as N,N-dimethylformamide, N,N-dimethylacetamide, and N-methyl-2-pyrrolidone; chloroform; and dimethylsulfoxide. The organic solvents may be used alone or in combination.

The vinyl acetate-silicone copolymer resin of the present invention can be used as a coating agent. In this case, a coating composition is obtained by mixing and dissolving the vinyl acetate-silicone copolymer resin and other components by a known mixing preparation method such as a propeller-type stirrer, a homogenizer, a ball mill, or a bead mill. When the coating composition is applied or immersed, and dried on one surface or both surfaces of a substrate such as glass or resin as a coating agent, slidability and substrate adhesiveness can be imparted.

EXAMPLES

Hereinafter, the present invention is described in detail below with reference to Examples and Comparative Examples, but the present invention is not limited to the following Production Examples and Examples. The molecular weight described below is a weight average molecular weight (Mw) as obtained by viscosity measurement obtained from the specific viscosity of a toluene solution of an organopolysiloxane having a concentration of 1 g/100 ml. In the following examples, "parts" and "%" indicate "parts by weight" and "wt %", respectively.

Example 1

A 2-L polyethylene beaker was charged with a solution obtained by dissolving 498 g of octamethylcyclotetrasiloxane, 46 g of vinylmethyldimethoxysilane, and 5 g of sodium lauryl sulfate in 45 g of pure water, and a solution obtained by dissolving 5 g of dodecylbenzenesulfonic acid in 45 g of pure water. The mixture was uniformly emulsified with a homomixer, and then diluted by slowly adding 400 g of water. The resulting diluted solution was caused to pass through a high-pressure homogenizer twice at a pressure of 300 kgf/cm$^2$ to obtain a uniform white emulsion. This emulsion was transferred to a 2-L glass flask equipped with a stirrer, a thermometer, and a reflux condenser, where a polymerization reaction took place at 55° C. for 24 hours. Then, the emulsion was aged at 10° C. for 24 hours, and then neutralized to pH 7 with a 10% aqueous sodium carbonate solution. The emulsion has a nonvolatile content (solid content) of 45% after dried at 105° C. for 3 hours, and the organopolysiloxane in the emulsion is a non-flowable soft gel. This silicone composition had a structure represented by the formula (1) and had a molecular weight of about 400,000 from the viscosity of the toluene solution. The structure of the organopolysiloxane obtained by the polymerization reaction was confirmed by $^1$H-NMR (frequency: 600 MHz, room temperature, number of integrations: 128) and $^{29}$Si-NMR (frequency: 600 MHz, room temperature, number of integrations: 5000) (device name: JNM-ECA 600, measurement solvent: CDCl$_3$).

Then, 25 g of polyoxyethylene alkyl ether was added thereto, and a reaction was performed using an initiator at 80° C. while 233 g of vinyl acetate was added dropwise over 3 to 5 hours to perform vinyl acetate graft copolymerization on the silicone composition, thereby obtaining a silicone vinyl acetate copolymer resin emulsion having a nonvolatile content of 30%.

Example 2

A silicone vinyl acetate copolymer resin emulsion having a nonvolatile content of 30% was obtained in the same manner as in Example 1 except that the amount of vinyl acetate was changed to 544 g.

Example 3

A silicone vinyl acetate copolymer resin emulsion having a nonvolatile content of 30% was obtained in the same manner as in Example 1 except that the amount of vinyl acetate was changed to 1269 g.

Example 4

A 2-L polyethylene beaker was charged with a solution obtained by dissolving 498 g of octamethylcyclotetrasiloxane, 1.1 g of vinylmethyldimethoxysilane, and 5 g of sodium lauryl sulfate in 45 g of pure water, and a solution obtained by dissolving 5 g of dodecylbenzenesulfonic acid in 45 g of pure water. The mixture was uniformly emulsified with a homomixer, and then diluted by slowly adding 400 g of water. The resulting diluted solution was caused to pass through a high-pressure homogenizer twice at a pressure of 300 kgf/cm$^2$ to obtain a uniform white emulsion. This emulsion was transferred to a 2-L glass flask equipped with a stirrer, a thermometer, and a reflux condenser, where a polymerization reaction took place at 55° C. for 24 hours. Then, the emulsion was aged at 10° C. for 24 hours, and then neutralized to pH 7 with a 10% aqueous sodium carbonate solution. The emulsion has a nonvolatile content of 45% after dried at 105° C. for 3 hours, and the organopolysiloxane in the emulsion is a non-flowable soft gel. This silicone composition had a structure represented by the formula (1) and had a molecular weight of about 400,000 from the viscosity of the toluene solution. Then, 23 g of polyoxyethylene alkyl ether was added thereto, and a reaction was performed using an initiator at 80° C. while 1165 g of vinyl acetate was added dropwise over 3 to 5 hours to perform vinyl acetate graft copolymerization on the silicone composition, thereby obtaining a silicone vinyl acetate copolymer resin emulsion having a nonvolatile content of 30%.

Example 5

A 2-L polyethylene beaker was charged with a solution obtained by dissolving 498 g of octamethylcyclotetrasiloxane, 2.5 g of γ-methacryloxypropylmethyldimethoxysilane, and 5 g of sodium lauryl sulfate in 45 g of pure water, and a solution obtained by dissolving 5 g of dodecylbenzenesulfonic acid in 45 g of pure water. The mixture was uniformly emulsified with a homomixer, and then diluted by slowly adding 400 g of water. The resulting diluted solution was caused to pass through a high-pressure homogenizer twice at a pressure of 300 kgf/cm$^2$ to obtain a uniform white emulsion. This emulsion was transferred to a 2-L glass flask equipped with a stirrer, a thermometer, and a reflux condenser, where a polymerization reaction took place at 55° C. for 24 hours. Then, the emulsion was aged at 10° C. for 24 hours, and then neutralized to pH 7 with a 10% aqueous sodium carbonate solution. The emulsion has a nonvolatile content of 45% after dried at 105° C. for 3 hours, and the organopolysiloxane in the emulsion is a non-flowable soft gel. This silicone composition had a structure represented by the formula (1) and had a molecular weight of about 400,000 from the viscosity of the toluene solution. Then, 23 g of polyoxyethylene alkyl ether was added thereto, and a reaction was performed using an initiator at 80° C. while 1168 g of vinyl acetate was added dropwise over 3 to 5 hours to perform vinyl acetate graft copolymerization on the silicone composition, thereby obtaining a silicone vinyl acetate copolymer resin emulsion having a nonvolatile content of 30%.

Comparative Example 1

A 2-L polyethylene beaker was charged with a solution obtained by dissolving 498 g of octamethylcyclotetrasiloxane, 46 g of vinylmethyldimethoxysilane, and 5 g of sodium lauryl sulfate in 45 g of pure water, and a solution obtained by dissolving 5 g of dodecylbenzenesulfonic acid in 45 g of pure water. The mixture was uniformly emulsified with a homomixer, and then diluted by slowly adding 400 g of water. The resulting diluted solution was caused to pass through a high-pressure homogenizer twice at a pressure of 300 kgf/cm$^2$ to obtain a uniform white emulsion. This emulsion was transferred to a 2-L glass flask equipped with a stirrer, a thermometer, and a reflux condenser, where a polymerization reaction took place at 55° C. for 24 hours. Then, the emulsion was aged at 10° C. for 24 hours, and then neutralized to pH 7 with a 10% aqueous sodium carbonate solution to obtain a silicone emulsion composition.

The silicone emulsion had a nonvolatile content of 45% after dried at 105° C. for 3 hours, and the organopolysiloxane in the emulsion was a non-flowing soft gel. This silicone composition had a structure represented by the formula (1) and had a molecular weight of about 400,000 from the viscosity of the toluene solution.

Comparative Example 2

A 2-L glass flask equipped with a stirrer, a thermometer, and a reflux condenser was charged with 550 g of water, 4.5 g of sodium lauryl sulfate, and 18 g of polyoxyethylene alkyl ether, and a reaction was performed using an initiator at 80° C. while 450 g of vinyl acetate was added dropwise over 3 to 5 hours to perform vinyl acetate polymerization, thereby obtaining a vinyl acetate emulsion having a nonvolatile content of 45%.

Comparative Example 3

A 2-L polyethylene beaker was charged with a solution obtained by dissolving 498 g of octamethylcyclotetrasiloxane, 1.6 g of γ-methacryloxypropylmethyldimethoxysilane, and 5 g of sodium lauryl sulfate in 45 g of pure water, and a solution obtained by dissolving 5 g of dodecylbenzenesulfonic acid in 45 g of pure water. The mixture was uniformly emulsified with a homomixer, and then diluted by slowly adding 400 g of water. The resulting diluted solution was caused to pass through a high-pressure homogenizer twice at a pressure of 300 kgf/cm² to obtain a uniform white emulsion. This emulsion was transferred to a 2-L glass flask equipped with a stirrer, a thermometer, and a reflux condenser, where a polymerization reaction took place at 55° C. for 24 hours. Then, the emulsion was aged at 15° C. for 24 hours, and then neutralized to pH 7 with a 10% aqueous sodium carbonate solution. The emulsion has a nonvolatile content of 45% after dried at 105° C. for 3 hours, and the organopolysiloxane in the emulsion is a non-flowable soft gel. This silicone composition had a structure represented by the formula (1) and had a molecular weight of about 250,000 from the viscosity of the toluene solution. Then, 15 g of polyoxyethylene alkyl ether was added thereto, and a reaction was performed using an initiator at 80° C. while 500 g of butyl acrylate was added dropwise over 3 to 5 hours to perform acryl graft copolymerization on the silicone composition, thereby obtaining a silicone acryl copolymer resin emulsion having a nonvolatile content of 30%.

Comparative Example 4

300 g of the silicone emulsion obtained in Comparative Example 1 and 700 g of the vinyl acetate emulsion obtained in Comparative Example 2 were stirred and mixed for 1 hour to obtain a mixed emulsion having a nonvolatile content of 45%.

The emulsions obtained in Examples 1 to 5 and Comparative Examples 1 to 4 were evaluated by the following method. The results are shown in Table 1.

<Graft Point>

The graft point was calculated by the following calculation formula.

A=weight of silane coupling agent/molecular weight of silane coupling agent

B=(weight of siloxane)/(calculated molecular weight of organopolysiloxane)

The value of "A/B" is defined as the number of graft points.

For example, in the silicone vinyl acetate copolymer resin emulsion shown in Production Example 1, calculation is:

$A=46/132=0.35$ mol;

$B=(498+46)/400,000=0.00136$ mol; and

"A/B≈250", indicating that the number of graft points is "250".

The number of the graft points can be adjusted by the amount of the silane coupling agent.

<Solid Content Measuring Method>

About 1 g of a sample was precisely weighed in an aluminum foil dish, which was placed in a dryer kept at about 105° C., heated for 1 hour, taken out of the dryer, and placed in a desiccator where the sample was allowed to cool. The weight of the sample after dried was measured. An evaporation residue was calculated according to the following formula:

$$R = \frac{T-L}{W-L} \times 100$$

R: evaporation residue (%)
W: weight (g) of aluminum foil dish containing sample before drying
L: weight (g) of aluminum foil dish
T: weight (g) of aluminum foil dish containing dried sample
Dimension of aluminum foil dish: 65φ×23 h (mm)

<Viscosity Measuring Method>

While a sample was kept at a liquid temperature of 23±0.5° C., a viscosity was measured by a BM type viscometer (No. 1 rotor, 6 rpm).

<Method for Measuring Mean Particle Size of Emulsion>

The mean particle size of the emulsion was measured using a zeta potential/particle size/molecular weight measurement system (ELSZ-2000ZS) manufactured by Otsuka Electronics Co., Ltd.

<Measurement of Static and Dynamic Friction Coefficients>

The emulsion composition of each of Examples and Comparative Examples was applied to a PET film by a bar coater, and dried at 105° C. for 3 minutes, to form a coated film so as to have a thickness of about 10 μm in a dry state.

A frictional force when a metal indenter of 30 g was vertically brought into contact with the coated film, and the metal indenter was moved at 3 cm/min was measured with HEIDON TYPE-38 (manufactured by Shinto Scientific Co., Ltd.), and a friction coefficient was calculated from the frictional force. Preferable ranges of the static and dynamic friction coefficients under the above conditions are respectively 0.3 or less and 0.20 or less.

<Solvent Solubility>

The emulsion composition of each of Examples and Comparative Examples was poured into a PP tray, and dried at 40° C. for 24 hours, to form a film so as to have a thickness of about 1 mm in a dry state. The formed film was molded into a size of 1 inch×1 inch to obtain a test piece for evaluation.

100 g of each solvent (water, methanol, DMF) was weighed and put in a glass bottle. The test piece whose weight was measured was put therein and stirred with a stirrer for 1 hour. After 1 hour, the mixture was filtered through 300 mesh, and dried at 40° C. for 24 hours. The weight was measured again, and a dissolution rate (%) was calculated from the weight reduction.

<Substrate Adhesiveness>

The emulsion composition of each of Examples and Comparative Examples was applied to a PET film by a bar coater, and dried at 105° C. for 3 minutes, to form a coated film so as to have a thickness of about 10 μm in a dry state.

The coated film was scratched with a cutter, and this portion was rubbed back and forth 10 times with a finger to visually evaluate adhesiveness.
○: No peeling from the substrate
x: Peeling from the substrate <Bleed Out>

The emulsion composition of each of Examples and Comparative Examples was poured into a PP tray, and dried at 40° C. for 24 hours, to form a film so as to have a thickness of about 1 mm in a dry state.

The bleed out state of silicone over time was visually observed on the surface of the coated film.
○: No bleed out was confirmed.
Δ: Slight bleed out was confirmed.
x: Significant bleed out was confirmed.

TABLE 1

|  |  | Example |  |  |  |  | Comparative Example |  |  |  |
|---|---|---|---|---|---|---|---|---|---|---|
|  |  | 1 | 2 | 3 | 4 | 5 | 1 | 2 | 3 | 4 |
| (A) Production of organopolysiloxane | D4 (Octamethylcyclotetrasiloxane) | 100 | 100 | 100 | 100 | 100 | 100 | — | 100 | — |
|  | Vinylmethyldimethoxysilane | 9.2 | 9.2 | 9.2 | 0.2 | — | 9.2 | — | 0.3 | — |
|  | γ-methacryloxypropylmethayldimethoxysilane | — | — | — | — | 0.5 | — | — | — | — |
|  | Number of graft points | 250 | 250 | 250 | 7 | 9 | 250 | — | 3 | — |
| Graft copolymer resin (weight ratio) | (A) Organopolysiloxane | 70 | 50 | 30 | 30 | 30 | 100 | 0 | 50 | 30 |
|  | (B) Vinyl acetate | 30 | 50 | 70 | 70 | 70 | 0 | 100 | 0 | 70 |
|  | (B') Butyl acrylate | 0 | 0 | 0 | 0 | 0 | 0 | 0 | 50 | 0 |
| Evaluation results | Solid content (%) | 30 | 30 | 30 | 30 | 30 | 45 | 45 | 30 | 45 |
|  | Viscosity (mPa · s) | 10 | 10 | 10 | 10 | 10 | 300 | 100 | 10 | 150 |
|  | Mean particle size (nm) | 300 | 300 | 300 | 300 | 300 | 300 | 300 | 300 | 300 |
|  | Static friction coefficient | 0.2 | 0.1 | 0.1 | 0.1 | 0.1 | No | 0.8 | 0.5 | 0.1 |
|  | Dynamic friction coefficient | 0.12 | 0.09 | 0.10 | 0.01 | 0.07 | film | 0.56 | 0.22 | 0.08 |
|  | Water dissolution rate (%) | 4 | 9 | 1 | 1 | 1 | form- | 100 | 5 | 2 |
|  | Methanol dissolution rate (%) | 18 | 96 | 100 | 73 | 69 | ation | 100 | 11 | 79 |
|  | DMF dissolution rate (%) | 28 | 87 | 100 | 84 | 75 |  | 100 | 9 | 90 |
|  | Substrate adhesiveness | ○ | ○ | ○ | ○ | ○ |  | ○ | x | ○ |
|  | Bleed out | ○ | ○ | ○ | ○ | ○ |  | — | ○ | x |

As shown in Table 1 above, the silicone emulsion composition of Comparative Example 1 was not formed into a film. The vinyl acetate emulsion composition of Comparative Example 2 had poor slidability and water resistance. The silicone acrylic copolymer resin emulsion composition of Comparative Example 3 had poor slidability and organic solvent solubility. In the mixed emulsion composition of Comparative Example 4, the bleed out of the silicone component was confirmed. Meanwhile, the silicone vinyl acetate copolymer resin emulsion compositions of Examples 1 to 5 provide coated films having excellent slidability, water resistance, and organic solvent solubility.

Japanese Patent Application No. 2021-030514 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

The invention claimed is:

1. A vinyl acetate-silicone copolymer resin obtained by graft polymerization of vinyl acetate (B) onto an organopolysiloxane (A) of the following general formula (1), wherein
a weight ratio of the organopolysiloxane (A) to the vinyl acetate (B) is (A):(B)=30:70 to 70:30,

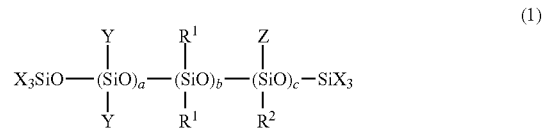

wherein $R^1$ is the same or different substituted or unsubstituted monovalent hydrocarbon group of 1 to 20 carbon atoms selected from the group consisting of alkyl groups, cycloalkyl groups, aryl groups, alkenylaryl groups, alkenylaralkyl groups, a substituted one in which a part or all hydrogen atoms of the above groups are substituted with a halogen atom, a carboxyl group, an alkoxy group, an alkenyloxy group, an amino group, and an alkyl-, alkoxy- or (meth)acryloxy-substituted amino group, $R^2$ is a mercapto, acryloxy or methacryloxy group-substituted alkyl group having 1 to 6 carbon atoms, or a vinyl group, X is the same or different substituted or unsubstituted monovalent hydrocarbon group of 1 to 20 carbon atoms, an alkoxy group having 1 to 20 carbon atoms, or a hydroxyl group, Y is the same or different group of X or —[O—Si(X)$_2$]$_d$—X, at least one of Y being a hydroxyl group or —[O—Si(X)$_2$]d-X, at least two of X and Y being hydroxyl groups, Z is an alkyl group having 1 to 4 carbon atoms, an alkoxy group having 1 to 4 carbon atoms, or a hydroxyl group, a is a positive number of 0 to 1,000, b is a positive number of 100 to 10,000, c is a positive number of 1 to 10, and d is a positive number of 1 to 1,000, and wherein the vinyl acetate-silicone copolymer resin is an emulsion having a viscosity (25° C.) of 1 to 500 mPa·s.

2. The vinyl acetate-silicone copolymer resin according to claim 1, wherein the organopolysiloxane as the component (A) has a weight average molecular weight (Mw) of 10,000 to 1,000,000 as obtained by viscosity measurement.

3. The vinyl acetate-silicone copolymer resin according to claim 1, wherein the organopolysiloxane of the formula (1) is a polymer of a cyclic organosiloxane, an α,ω-dihydroxysiloxane oligomer, an α,ω-dialkoxysiloxane oligomer, or an alkoxysilane, and a silane coupling agent of the following general formula (2):

wherein $R^3$ is a mercapto, acryloxy or methacryloxy group-substituted alkyl group having 1 to 6 carbon atoms, $R^4$ is an alkyl group having 1 to 4 carbon atoms, $R^5$ is an alkyl group having 1 to 4 carbon atoms, e is 2 or 3, f is 0 or 1, and e+f is 2 or 3.

4. A vinyl acetate-silicone copolymer resin composition comprising the vinyl acetate-silicone copolymer resin according to claim 1,
wherein the vinyl acetate-silicone copolymer resin composition is used as a product selected from the group consisting of a coating agent, a fiber treatment agent, an adhesive agent, a paint, and a cosmetic.

5. The vinyl acetate-silicone copolymer resin according to claim 1, wherein a graft moiety of the vinyl acetate-silicone copolymer resin consists of the vinyl acetate (B).

6. The vinyl acetate-silicone copolymer resin according to claim 1, wherein a graft moiety of the vinyl acetate-silicone copolymer resin does not comprise an acrylic monomer.

7. The vinyl acetate-silicone copolymer resin according to claim 1, wherein the weight ratio of the organopolysiloxane (A) to the vinyl acetate (B) is (A):(B)=50:50 to 70:30.

8. A method for producing a vinyl acetate-silicone copolymer resin,
the method comprising subjecting an organopolysiloxane (A) of the following general formula (1) and vinyl acetate (B) to emulsion polymerization at a weight ratio of (A):(B)=30:70 to 70:30 to obtain a vinyl acetate-silicone copolymer resin emulsion:

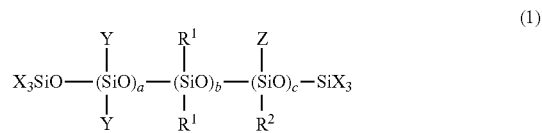

wherein $R^1$ is the same or different substituted or unsubstituted monovalent hydrocarbon group having 1 to 20 carbon atoms selected from the group consisting of alkyl groups, cycloalkyl groups, aryl groups, alkenylaryl groups, alkenylaralkyl groups, a substituted one in which a part or all hydrogen atoms of the above groups are substituted with a halogen atom, an acryloxy group, a methacryloxy group, a carboxyl group, an alkoxy group, an alkenyloxy group, an amino group, and an alkyl-, alkoxy- or (meth)acryloxy-substituted amino group, $R^2$ is a mercapto, acryloxy or methacryloxy group-substituted alkyl group having 1 to 6 carbon atoms, or a vinyl group, X is the same or different substituted or unsubstituted monovalent hydrocarbon group having 1 to 20 carbon atoms, an alkoxy group having 1 to 20 carbon atoms, or a hydroxyl group, Y is the same or different group of X or —[O—Si $(X)_2]_d$—X, at least two of X and Y being hydroxyl groups, Z is an alkyl group having 1 to 4 carbon atoms, an alkoxy group having 1 to 4 carbon atoms, or a hydroxyl group, a is a positive number of 0 to 1,000, b is a positive number of 100 to 10,000, c is a positive number of 1 to 10, and d is a positive number of 1 to 1,000.

\* \* \* \* \*